(12) United States Patent
Clark

(10) Patent No.: US 11,022,152 B2
(45) Date of Patent: Jun. 1, 2021

(54) HYDRAULIC SYSTEM

(71) Applicant: Thomas Earl Clark, St. Louis, MO (US)

(72) Inventor: Thomas Earl Clark, St. Louis, MO (US)

( * ) Notice: Subject to any disclaimer, the term of this patent is extended or adjusted under 35 U.S.C. 154(b) by 59 days.

(21) Appl. No.: 16/573,016

(22) Filed: Sep. 17, 2019

(65) Prior Publication Data

US 2020/0124145 A1 Apr. 23, 2020

Related U.S. Application Data

(60) Provisional application No. 62/747,183, filed on Oct. 18, 2018.

(51) Int. Cl.
*F15B 7/00* (2006.01)
*F16H 19/04* (2006.01)
*F15B 15/04* (2006.01)

(52) U.S. Cl.
CPC .............. *F15B 7/008* (2013.01); *F15B 15/04* (2013.01); *F16H 19/043* (2013.01)

(58) Field of Classification Search
CPC ........ F16H 19/043; F03C 1/03; F15B 11/187; F15B 11/18; F15B 11/186; F15B 15/1404
See application file for complete search history.

(56) References Cited

U.S. PATENT DOCUMENTS 3,938,332 A * 2/1976 Roces ..................... F15B 7/006
60/536

* cited by examiner

*Primary Examiner* — Abiy Teka
*Assistant Examiner* — Daniel S Collins
(74) *Attorney, Agent, or Firm* — Brett A. Schenck

(57) ABSTRACT

The present application is directed to a system for converting linear motion to rotary motion. The system includes at least first and second cylinders. The first and second cylinders are in fluid communication with each other. The system also includes a first piston. The first piston is slidably disposed in the first cylinder. The system further includes a second piston. The second piston is slidably disposed in the second cylinder. The first and second cylinders contain an incompressible fluid. The first piston is in operative connection with the second piston such that movement of the first piston in a first direction causes movement of the second piston in a second direction, wherein the second direction is opposite the first direction.

20 Claims, 5 Drawing Sheets

US 11,022,152 B2

HYDRAULIC SYSTEM

CROSS-REFERENCE TO RELATED APPLICATIONS

This application claims benefit under 35 U.S.C. § 119(e) of Provisional Application No. 62/747,183 filed Oct. 18, 2018, the disclosure of which is incorporated by reference in its entirety.

FIELD

This application relates generally to a hydraulic system.

BACKGROUND

An engine or motor is a machine designed to convert one form of energy into mechanical energy. Heat engines, like the internal combustion engine, burn a fuel to create heat which is then used to do work. Internal combustion engines have a maximum thermal efficiency of about 25% to 50% when used to power a car. In other words, even when the engine is operating at its point of maximum thermal efficiency, of the total heat energy released by the gasoline consumed, about 50-75% of total power is emitted as heat without being turned into useful work, i.e. turning the crankshaft. Approximately half of this rejected heat is carried away by the exhaust gases, and half passes through the cylinder walls or cylinder head into the engine cooling system, and is passed to the atmosphere via the cooling system radiator. Some of the work generated is also lost as friction, noise, air turbulence, and work used to turn engine equipment and appliances such as water and oil pumps and the electrical generator, leaving only about 25-50% of the energy released by the fuel consumed available to move the vehicle. The exhaust gases also increase air pollution. Electric motors may also be used to convert electrical energy into mechanical motion to drive vehicles or operate other machines.

Engines or motors may benefit from improvements.

SUMMARY

In one aspect of the present invention, a system for converting linear motion to rotary motion is provided. The system includes at least first and second cylinders. The first and second cylinders are in fluid communication with each other. The system also includes a first piston. The first piston is slidably disposed in the first cylinder. The system further includes a second piston. The second piston is slidably disposed in the second cylinder. The first and second cylinders contain an incompressible fluid. The first piston is in operative connection with the second piston such that movement of the first piston in a first direction causes movement of the second piston in a second direction, wherein the second direction is opposite the first direction.

Other aspects of the disclosed invention will become apparent from the following detailed description, the accompanying drawings and the appended claims.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
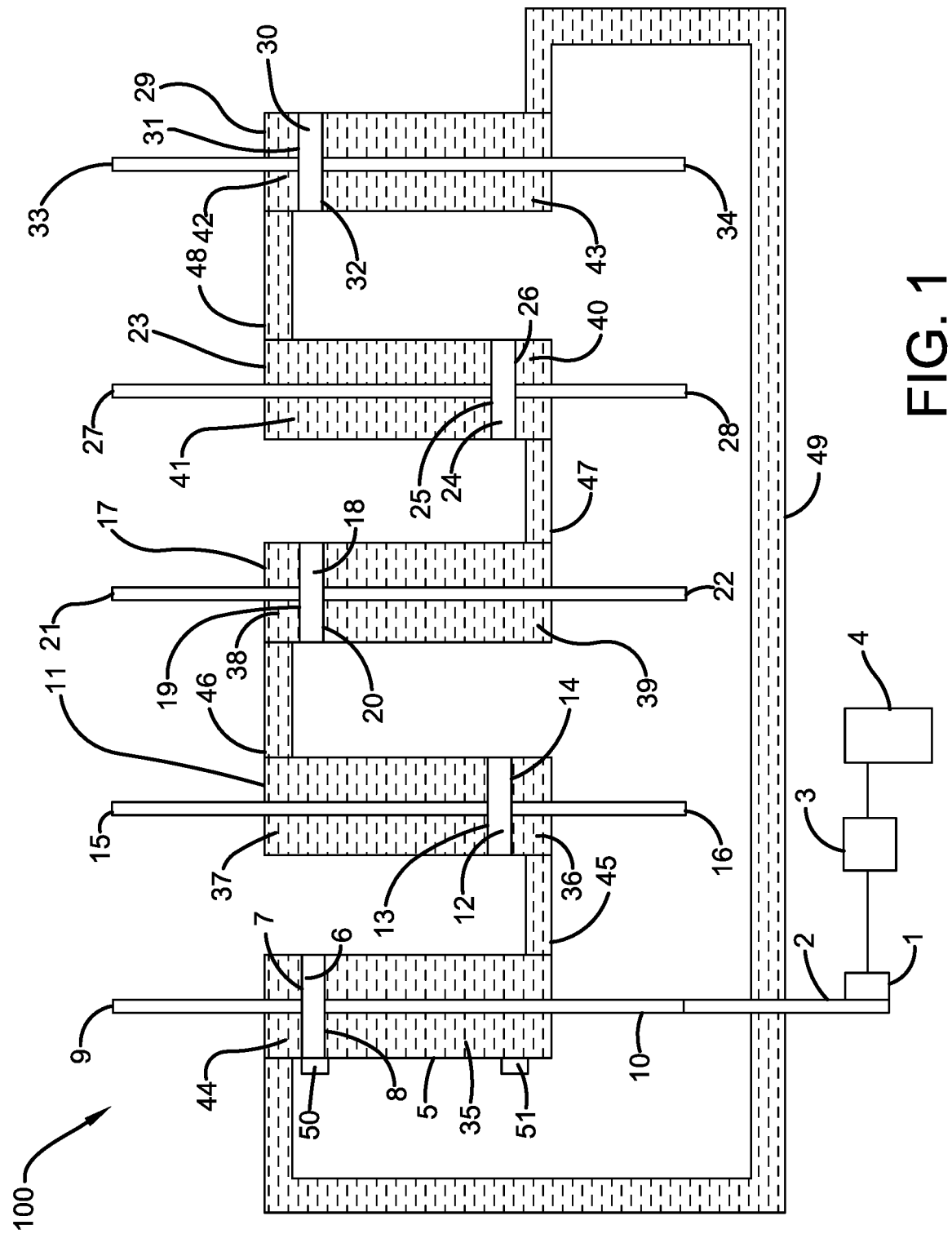
FIG. 1 is a schematic front sectional view of an embodiment of the present invention showing the cylinders, pistons, rods, and hoses and their interconnections in a second state.

Throughout the present description, the terms "upper", "lower", "top", "bottom", "left", "right", "front", "forward", "rear", and "rearward" shall define directions or orientations with respect to the hydraulic system as illustrated in FIG. 1. It will be understood that the spatially relative terms "upper", "lower", "top", "bottom", "left", "right", "front", "forward", "rear", and "rearward" are intended to encompass different orientations of the hydraulic system in use or operation in addition to the orientation depicted in the figures. For example, if the hydraulic system in the figures is turned over, elements described as "upper" elements or features would then be "lower" elements or features.

Figure 2:
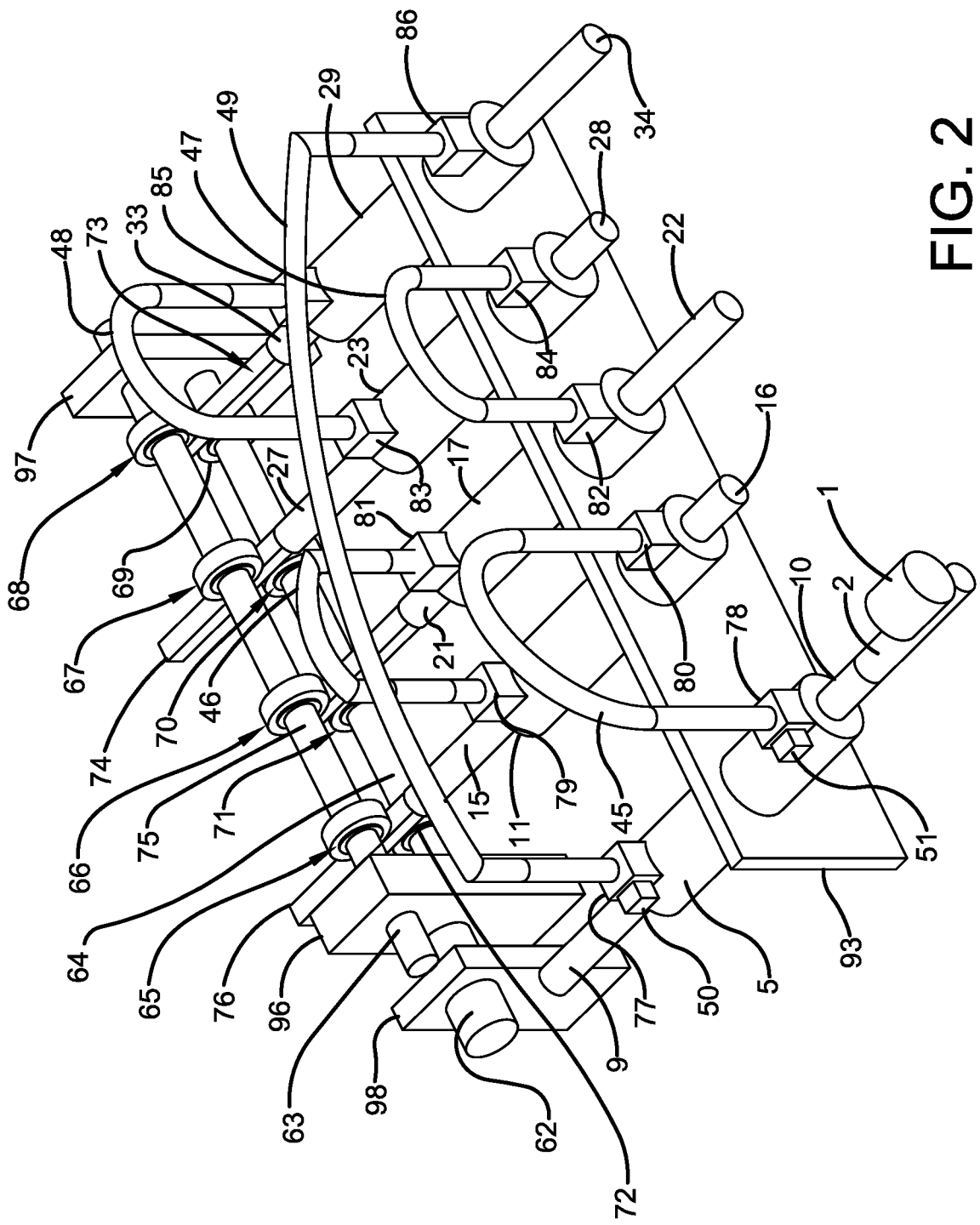
FIG. 2 is a schematic front and bottom perspective view of the embodiment of the present invention of FIG. 1a with the cylinders attached to rack gears, gears, sprag clutches, and shafts.
Figure 3:
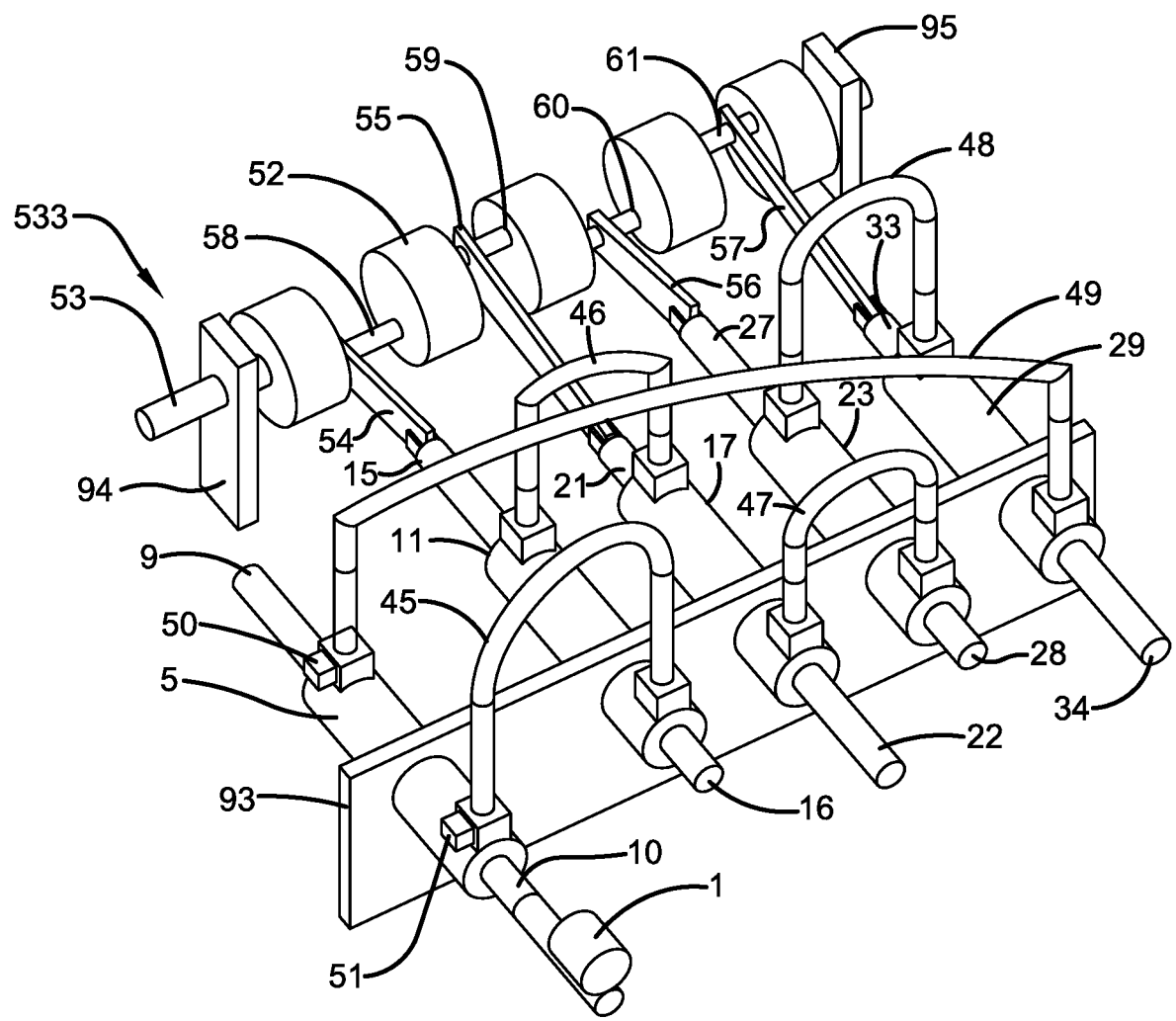
FIG. 3 is a schematic front and bottom perspective view of the embodiment of the present invention of FIG. 1a with the cylinders attached to a crankshaft.
Figure 4:
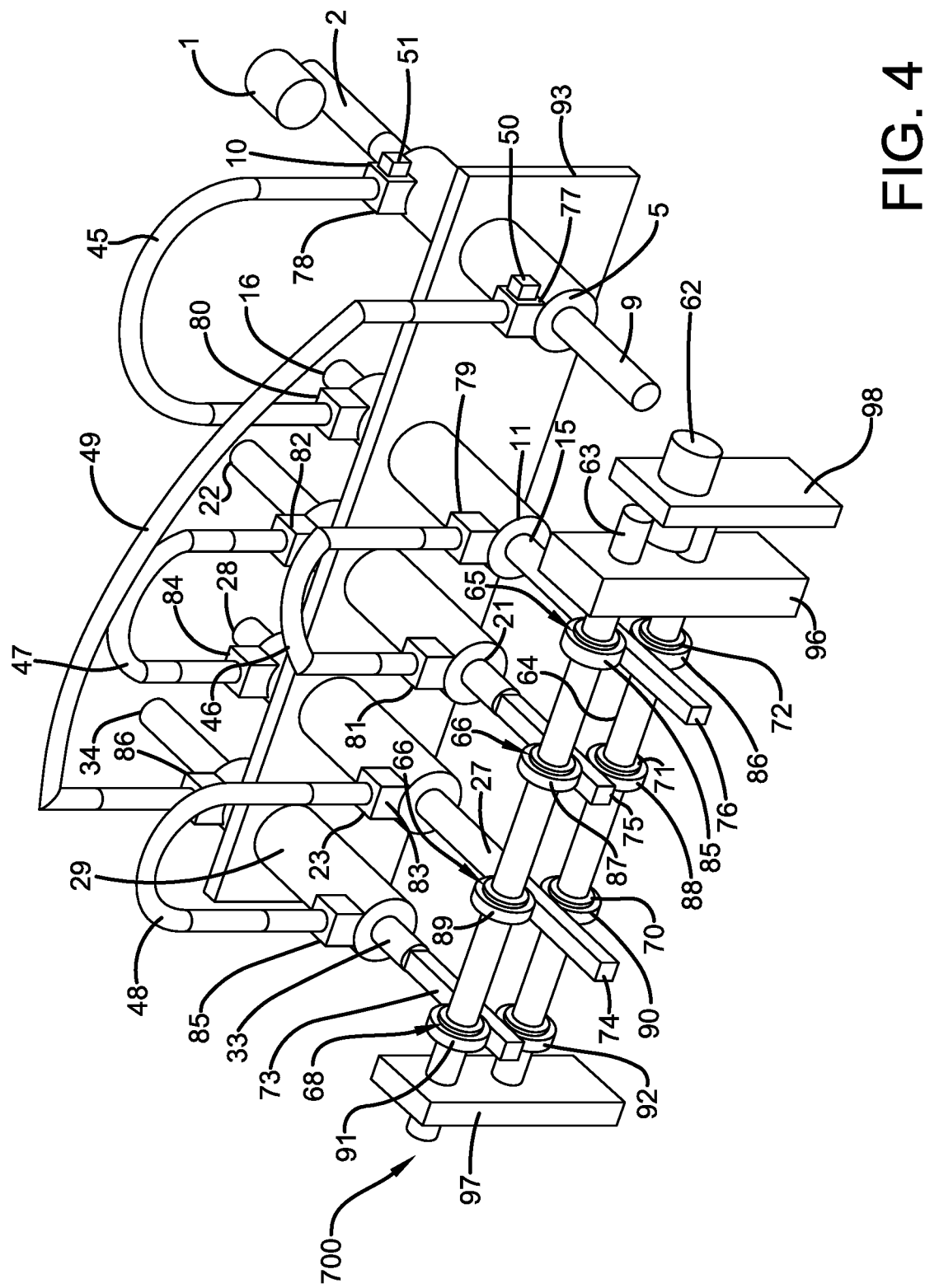
FIG. 4 is a schematic rear and bottom perspective view of the embodiment of the present invention shown in FIG. 2.

As illustrated in FIGS. 1 to 4, a first exemplary embodiment is provided. Referring to FIG. 1, a system 100 is shown that comprises a drive cylinder 5, a first cylinder 11, a second cylinder 17, a third cylinder 23, and a fourth cylinder 29. These cylinders may be identical cylinders. All cylinders 5, 11, 17, 23, 29 will be double acting/double rod cylinders with the same bore size and stroke. Referring to FIGS. 2 and 4, hydraulic ports 77, 78, 79, 80, 81, 82, 83, 84, 85, 86 fluidly connected to the cylinders 5, 11, 17, 23, 29, respectively, all have the same diameter. Piston rods 9, 10, 15, 16, 21, 22, 27, 28, 33, 34 received in their respective cylinders 5, 11, 17, 23, and 29 also have the same diameter. The cylinders extend through a support member 93 that supports them.

As illustrated by the Figures, the present invention comprises an electric cylinder 1, an electric cylinder rod 2, a drive hydraulic cylinder 5, and a plurality of additional cylinders. In this exemplary embodiment there are four such additional cylinders 11, 17, 23, and 29. Hydraulic hose sections 45, 46, 47, 48, and 49 fluidly connect the hydraulic cylinders 5, 11, 17, 23, and 29 via the hydraulic ports 77, 78, 79, 80, 81, 82, 83, 84, 85, 86 (FIGS. 2 and 4). A hydraulic drive cylinder piston 6 is slidably disposed in the drive cylinder 5, a first cylinder piston 12 is slidably disposed in the first cylinder 11, a second cylinder piston 18 is slidably disposed in the second cylinder 17, a third cylinder piston 24 is slidably disposed in the third cylinder 23, and a fourth cylinder piston 30 is slidably disposed in the fourth cylinder 29.

The system further comprises cylinder rods. Specifically, drive cylinder input rod 10 and drive cylinder output rod 9 are connected to drive cylinder piston 6. First cylinder input rod 16 and first cylinder output rod 15 are connected to the first cylinder piston 12. Second cylinder input rod 22 and second cylinder output rod 21 are connected to the second cylinder piston 18. Third cylinder input rod 28 and third cylinder output rod 27 are connected to third cylinder piston 24. Fourth cylinder input rod 34 and fourth cylinder output rod 33 are connected to the fourth cylinder piston 30.

The electric cylinder 1 is connected to electric cylinder rod 2. The electric cylinder rod 2 is connected to the drive cylinder input rod 10. When energized, the electric cylinder 1 creates a linear force on the electric cylinder rod 2 in either an extending motion or a retracting motion relative to the electric cylinder 1. The drive cylinder input rod 10 is connected to the drive cylinder piston 6 which is connected to the drive cylinder rod 9. The drive cylinder input rod 10, drive cylinder piston 6, and drive cylinder output rod 9 all move together and oscillate within the drive cylinder 5.

The first cylinder input rod 16 is connected to the first cylinder piston 12 which is also connected to the first cylinder output rod 15. The first cylinder input rod 16, first cylinder piston 12, and first cylinder output rod 15 all move together and oscillate within the first cylinder 11. The second cylinder input rod 22 is connected to the second cylinder piston 18 which is connected to the second cylinder output rod 21. The second cylinder input rod 22, the second cylinder piston 18, and the second cylinder output rod 21 all move together and oscillate within the second cylinder 17.

The third cylinder input rod 28 is connected to the third cylinder piston 24 which is connected to the third cylinder output rod 27. The third cylinder input rod 28, the third cylinder piston 24, and the third cylinder output rod 27 all move together and oscillate within the third cylinder 23. The fourth cylinder input rod 34 is connected to the fourth cylinder piston 30 which is connected to the fourth cylinder output rod 33. The fourth cylinder rod 34, the fourth cylinder piston 30, and the fourth cylinder output rod 33 all move together and oscillate within the fourth cylinder 29.

The drive cylinder 5 is fluidly connected to first cylinder 11 via a first hydraulic hose 45. The first cylinder 11 is fluidly connected to the second cylinder 17 via a second hydraulic hose 46. The second cylinder 17 is fluidly connected to the third cylinder 23 via a third hydraulic hose 47. The third cylinder 23 is fluidly connected to the fourth cylinder 29 via a fourth hydraulic hose 48. The drive cylinder 5 is also fluidly connected to fourth cylinder 29 via a fifth hydraulic hose 49.

A top sensor 50 is operatively coupled to the drive cylinder near the top of the drive cylinder 5. The top sensor 50 detects when the piston 6 is adjacent to the top sensor 50, which position is near the top of the drive cylinder 5. The bottom sensor 51 is operatively coupled to the drive cylinder 5 at the bottom of the drive cylinder 5. The bottom sensor 51 detects when the piston 6 is adjacent to the bottom sensor 51, which position is at or near the bottom of the drive cylinder 5.

The hydraulic system may include a controller 3. The controller 3 may be operatively coupled to the top sensor 50 and the bottom sensor 51. The controller 3 may include a processor with appropriate software and/or firmware to cause the processor to carry out the functions of the controller described herein. However, it is to be understood that the controller 3 may include an electrical circuit that does not include software/firmware. Also, the described controller 3 may include one or more processors, and circuits to carry out the functions described herein. The top sensor 50 and the bottom sensor 51 send signals to the controller 3 to extend electric cylinder 1 or to retract electric cylinder 1. In particular, when the top sensor 50 detects that the piston 6 is near the top of the drive cylinder 5, the top sensor 50 activates and sends a signal to the controller 3 to retract the electric cylinder 1. When the bottom sensor 51 detects that the piston 6 is at the bottom of the drive cylinder 5, the bottom sensor 51 activates and sends a signal to the controller 3 to extend the electric cylinder 1.

The present invention converts linear motion to rotary motion and this application shows two different embodiments directed to rotating motion apparatuses. One apparatus includes crank connections which connect from the cylinder rods to the crankshaft. This arrangement is depicted in FIG. 3. In particular, this apparatus includes a crankshaft assembly 533 that comprises crankshaft elements 53 thru 61 and how they attach to the output cylinder rods 15, 21, 27, and 33. The crankshaft assembly includes a crankshaft 52, an output shaft 53, crank throws 58, 59, 60, and 61, and cranks 54, 55, 56, and 57. The crankshaft assembly 533 is supported by support members 94, 95.

The first crank throw 58 is rotatably connected to the first crank 54. The second crank throw 59 is rotatably connected to the second crank 55. The third crank throw 60 is rotatably connected to the third crank 56. The fourth crank throw 61 is rotatably connected to the fourth crank 57. The first cylinder output rod 15 is pivotally connected to first crank 54. The second cylinder output rod 21 is pivotally connected to the second crank 55. The third cylinder output rod 27 is pivotally connected to the third crank 56, and the fourth cylinder output rod 33 is pivotally connected to fourth crank 57.

In operation, the beginning state of the machine (FIG. 1*a*) has first hydraulic hose 45, second hydraulic hose 46, third hydraulic hose 47, fourth hydraulic hose 48, and fifth hydraulic hose 49 filled with hydraulic liquid such as hydraulic oil. Also, in the beginning state of the machine, the cylinders are all filled to capacity with hydraulic liquid such as hydraulic oil. In particular, the drive cylinder 5 is filled with top drive cylinder liquid mass 44 and bottom drive cylinder liquid mass 35, the first cylinder 11 is filled with top first cylinder liquid mass 37 and bottom first cylinder liquid mass 36, the second cylinder 17 is filled with top second cylinder liquid mass 38 and bottom second cylinder liquid mass 39, the third cylinder 23 is filled with top third cylinder liquid mass 41 and bottom third cylinder liquid mass 40, the fourth cylinder 29 is filled with top fourth cylinder liquid mass 42 and bottom fourth cylinder liquid mass 43.

Figure 1A:
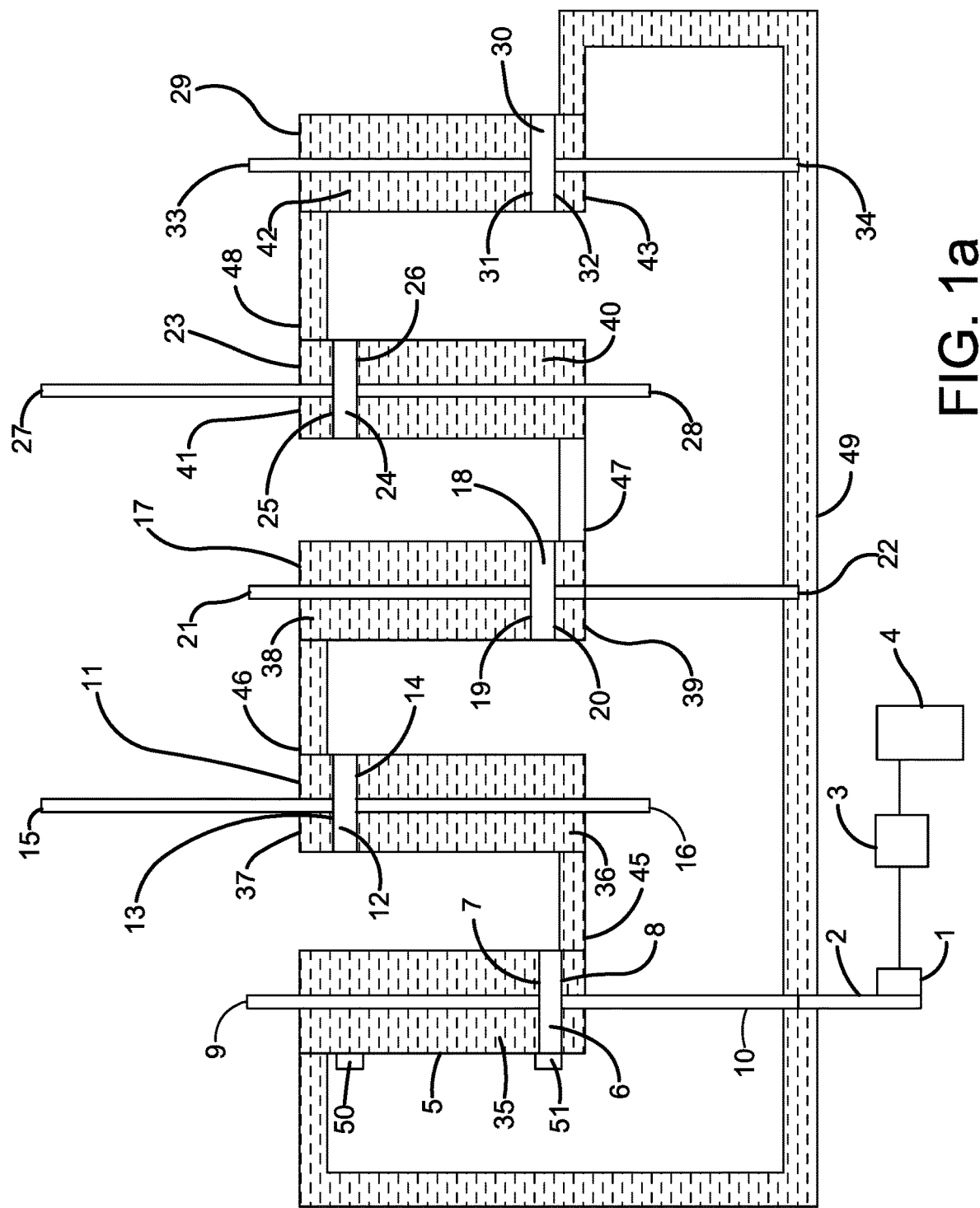
FIG. 1a is a view similar to FIG. 1 except that the present invention is in the beginning state.

As seen in FIG. 1*a*, in the beginning state of the machine, most of the drive cylinder input rod 10 extends out of the drive cylinder 5 in the fully extended position, the drive cylinder piston 6 is at the bottom sensor 51, and most of the drive cylinder output rod 9 is inside the drive cylinder 5 in the fully retracted position. Also, in the beginning state of the machine, most of the first cylinder output rod 15 extends out of the first cylinder 11 in the fully extended position, the first cylinder piston 12 is near the top of the first cylinder 11, and most of the first cylinder input rod 16 is inside the first cylinder 11 in the fully retracted position. Also, in the beginning state of the machine, most of the second cylinder input rod 22 extends out of the second cylinder 17 in the fully extended position, the second cylinder piston 18 is near the bottom of the second cylinder 17, and most of the second cylinder output rod 21 is inside the second cylinder 17 in the fully retracted position.

Also, in the beginning state of the machine, most of the third cylinder output rod 27 extends out of the third cylinder 23 in the fully extended position, the third cylinder piston 24 is near the top of the third cylinder 23, and most of the third cylinder input rod 28 is inside the third cylinder 23 in the fully retracted position. Also, in the beginning state of the machine, most of the fourth cylinder input rod 34 extends out of the fourth cylinder 29 in the fully extended position, the fourth cylinder piston 30 is near the bottom of the fourth cylinder 29, and most of the fourth cylinder output rod 33 is inside the fourth cylinder 29 in the fully retracted position.

By having the machine filled with liquid fluid as mentioned in the above paragraph, a solid or rigid connection is created between the drive cylinder piston 6, first cylinder piston 12, second cylinder piston 18, third cylinder piston 24, and fourth cylinder piston 30 since liquid fluid is essentially incompressible. Thus, a movement of drive cylinder piston 6 in the machine automatically causes all other pistons to move and each piston will move by the same distance as the drive cylinder piston 6. Therefore, a plurality of cylinders and pistons can be incorporated into the machine and all of them will be moved the same distance as the drive cylinder piston 6 i.e. the displacement of the volume of liquid fluid by drive cylinder piston 6 will be the same as the displacement of all other pistons and this will happen instantaneously since the liquid fluid in the machine acts as a rigid connection between all of the pistons since liquids are incompressible. The distance moved by drive cylinder piston 6 for a particular liquid fluid displacement will be the same distance that the first cylinder piston 12, second cylinder piston 18, third cylinder piston 24, and fourth cylinder piston 30 moves.

The first cylinder output rod 15, the second cylinder output rod 21, the third cylinder output rod 27, and the fourth cylinder output rod 33 will be connected to a mechanical apparatus to convert the linear motion to rotary motion (see FIG. 2 and FIG. 3).

In the following description the liquid fluid masses described are meant to be a sort of "generic" description for the portion of the liquid fluid mass occupying the indicated cylinder chamber portions at the time. The following sequence of movements are based on the beginning state of the machine described above. When electric cylinder 1 (FIG. 1 thru FIG. 4) is energized, bottom sensor 51 detects that the piston 6 is at the bottom of the drive cylinder 5, the bottom sensor 51 activates and sends a signal to the controller 3 to extend the electric cylinder 1. The electric cylinder 1 extends and exerts an upward force on the electric cylinder rod 2, which is sufficient to move the drive cylinder rod 10 and the drive cylinder piston 6 toward the top sensor 50. The sequence of the fluid movements, piston movements, and piston rod movements will happen instantaneously and the movements are as follows. The drive cylinder piston 6 creates an upward force on the drive cylinder rod 9 and top drive cylinder liquid mass 44 (FIG. 1). This upward force moves the drive cylinder top liquid mass 44 and causes liquid mass to be forced through the fifth hydraulic hose 49 and into the fourth cylinder 29 at the bottom fourth cylinder liquid mass 43. This in turn causes the bottom fourth cylinder liquid mass 43 to exert an upward force on the bottom side 32 of the fourth cylinder piston 30 that is sufficient to move the fourth cylinder piston 30 upwardly through the fourth cylinder 29 until the fourth cylinder piston 30 reaches near the top of the fourth cylinder 29. During the upward movement of the fourth cylinder piston 30, the top side 31 of the fourth cylinder piston 30 exerts an upward force on the top fourth cylinder liquid mass 42 to move it upwardly thereby causing liquid to flow through the fourth hydraulic hose 48 and into the third cylinder 23 at the top third cylinder liquid mass 41.

This in turn causes the top third cylinder liquid mass 41 to exert a downward force on the top side 25 of the third cylinder piston 24 that is sufficient to move the third cylinder piston 24 downwardly through the third cylinder 23 until the third cylinder piston 24 reaches near the bottom of the third cylinder 23. During the downward movement of the third cylinder piston 24, the bottom side 26 of the third cylinder piston 24 exerts a downward force on the bottom third cylinder liquid mass 40 to move it downwardly thereby causing liquid to flow through the third hydraulic hose 47 and into the second cylinder 17 at the bottom second cylinder liquid mass 39.

This in turn causes the bottom second cylinder liquid mass 39 to exert an upward force on the bottom side 32 of the second cylinder piston 18 that is sufficient to move the second cylinder piston 18 upwardly through the second cylinder 17 until the second cylinder piston 18 reaches near the top of the second cylinder 17. During the upward movement of the second cylinder piston 18, the top 19 of the second cylinder piston 18 exerts an upward force on the top second cylinder liquid mass 38 to move it upwardly thereby causing liquid to flow through the second hydraulic hose 46 and into the first cylinder 11 at the top first cylinder liquid mass 37.

This in turn causes the top first cylinder liquid mass 37 to exert a downward force on the top side 13 of the first cylinder piston 12 that is sufficient to move the first cylinder piston 12 downwardly through the first cylinder 11 until the first cylinder piston 12 reaches near the bottom of the first cylinder 11. During the downward movement of the first cylinder piston 12, the bottom side 14 of the first cylinder piston 12 exerts a downward force on the bottom first cylinder liquid mass 36 to move it downwardly thereby causing liquid to flow through the first hydraulic hose 45 and into the drive cylinder 5 at the bottom drive cylinder liquid mass 35 and replace the liquid that exited the drive cylinder 5 created by the upward movement of the drive cylinder piston 6. This completes the movements of the liquid fluid masses, cylinder pistons, and cylinder piston rods when the drive cylinder piston 6 travels from bottom sensor 51 to the top sensor 50.

FIG. 1 shows the hydraulic system in this second state when the drive cylinder piston 6 is at the top sensor 50. As seen in FIG. 1, in the second state of the machine, most of the drive cylinder output rod 9 extends out of the drive cylinder 5 in the fully extended position, the drive cylinder piston 6 is at the top sensor 50, and most of the drive cylinder input rod 10 is inside the drive cylinder 5 in the fully retracted position. Also, in the second state of the machine, most of the first cylinder input rod 16 extends out of the first cylinder 11 in the fully extended position, the first cylinder piston 12 is near the bottom of the first cylinder 11, and most of the first cylinder output rod 15 is inside the first cylinder 11 in the fully retracted position.

Also, in the second state of the machine, most of the second cylinder output rod 21 extends out of the second cylinder 17 in the fully extended position, the second cylinder piston 18 is near the top of the second cylinder 17, and most of the second cylinder input rod 22 is inside the second cylinder 17 in the fully retracted position.

Also, in the second state of the machine, most of the third cylinder input rod 28 extends out of the third cylinder 23 in the fully extended position, the third cylinder piston 24 is near the bottom of the third cylinder 23, and most of the third cylinder output rod 27 is inside the third cylinder 23 in the fully retracted position.

Also, in the second state of the machine, most of the fourth cylinder output rod 33 extends out of the fourth cylinder 29 in the fully extended position, the fourth cylinder piston 30 is near the top of the fourth cylinder 29, and most of the fourth cylinder input rod 34 is inside the fourth cylinder 29 in the fully retracted position.

The movements of liquid fluid masses, pistons, and piston rods when the drive cylinder piston 6 is moving from the top sensor 50 toward the bottom sensor 51 will be essentially the opposite of the movements described above for the case when the drive cylinder piston 6 moves from the bottom sensor 51 toward the top sensor 50.

In particular, when the top sensor 50 detects that the drive cylinder piston 6 is near the top of the drive cylinder 5, the top sensor 50 activates and sends a signal to the controller 3 to retract the electric cylinder 1. The electric cylinder 1 retracts and exerts a downward force on the electric cylinder rod 2, which is sufficient to move the drive cylinder rod 10 and the drive cylinder piston 6 toward the bottom sensor 51. The sequence of the fluid movements, piston movements, and piston rod movements will happen instantaneously and the movements are as follows. The drive cylinder piston 6 creates a downward force on the drive cylinder rod 9 and bottom drive cylinder liquid mass 35 (FIG. 1). This downward force moves the drive cylinder bottom liquid mass 35 and causes liquid mass to be forced through the first hydraulic hose 45 and into the first cylinder 11 at the bottom first cylinder liquid mass 36. This in turn causes the bottom fourth cylinder liquid mass 43 to exert an upward force on the bottom side 14 of the first cylinder 42 piston 12 that is sufficient to move the first cylinder piston 12 upwardly through the first cylinder 11 until the first cylinder piston 12 reaches near the top of the first cylinder 11. During the upward movement of the first cylinder piston 12, the top side 13 of the first cylinder piston 12 exerts an upward force on the top first cylinder liquid mass 37 to move it upwardly thereby causing liquid to flow through the second hydraulic hose 46 and into the second cylinder 17 at the top second cylinder liquid mass 38.

This in turn causes the top second cylinder liquid mass 38 to exert a downward force on the top side 19 of the second cylinder piston 18 that is sufficient to move the second cylinder piston 18 downwardly through the second cylinder 17 until the second cylinder piston 18 reaches near the bottom of the second cylinder 17. During the downward movement of the second cylinder piston 18, the bottom side 20 of the second cylinder piston 18 exerts a downward force on the bottom second cylinder liquid mass 39 to move it downwardly thereby causing liquid to flow through the third hydraulic hose 47 and into the third cylinder 17 at the bottom third cylinder liquid mass 40.

This in turn causes the bottom third cylinder liquid mass 40 to exert an upward force on the bottom side 26 of the third cylinder piston 24 that is sufficient to move the third cylinder piston 24 upwardly through the third cylinder 23 until the third cylinder piston 24 reaches near the top of the third cylinder 23. During the upward movement of the third cylinder piston 24, the top side 19 of the third cylinder piston 24 exerts an upward force on the top third cylinder liquid mass 41 to move it upwardly thereby causing liquid to flow through the fourth hydraulic hose 48 and into the fourth cylinder 29 at the top fourth cylinder liquid mass 42.

This in turn causes the top fourth cylinder liquid mass 42 to exert a downward force on the top side 31 of the fourth cylinder piston 30 that is sufficient to move the fourth cylinder piston 30 downwardly through the fourth cylinder 29 until the fourth cylinder piston 30 reaches near the bottom of the fourth cylinder 29. During the downward movement of the fourth cylinder piston 30, the bottom 32 of the fourth cylinder piston 30 exerts a downward force on the bottom fourth cylinder liquid mass 43 to move it downwardly thereby causing liquid to flow through the fifth hydraulic hose 49 and into the drive cylinder 5 at the top drive cylinder liquid mass 44 adjacent top side 7 of drive cylinder piston 6 and replace the liquid that exited the drive cylinder 5 adjacent bottom side 8 of drive cylinder piston 6 created by the downward movement of the drive cylinder piston 6.

It will be apparent that as drive cylinder piston 6 moves in one direction, the first cylinder piston 12 moves in the opposite direction. The first cylinder piston 12 moves in the opposite direction of the second cylinder piston 18. The second cylinder piston 18 moves in the opposite direction of the third cylinder piston 24. The third cylinder piston 24 moves in the opposite direction of the fourth cylinder piston 30. When the drive cylinder piston 6 oscillates, all other cylinder pistons 12, 18, 24, and 30 oscillate also. As described earlier, the linear movement from the cylinder pistons will also move piston rods 15, 21, 27, and 33. The ends of piston rods 15, 21, 27, and 33 will be connected to either cranks or rack gears as previously mentioned.

Operation of the rotating crank assembly will now be describe using the hydraulic system of the present invention. FIG. 3 depicts the rotating crank assembly in the beginning state. The crankshaft 52 and output shaft 53 and crank throws 58 thru 61 and cranks 54 thru 57 make up the rotating crankshaft assembly with the cranks 54, 55, 56, and 57 pivotally connected to the output cylinder rods 15, 21, 27, and 33 as previously mentioned. The linear motion of the first cylinder output rod 15 and the second cylinder output rod 21 and the third cylinder output rod 27 and the fourth cylinder output rod 33 transfers the force to cranks 54 thru 57 which are attached to crank throw 58, crank throw 59, crank throw 60, and crank throw 61, respectively. In particular, the first and third throws 58, 60 are at a first location near the circumferential end of the crankshaft 52 and the second and fourth throws 59, 61 are at a second location near the circumferential end of the crankshaft 52 that is diametrically opposite the first location. Thus, the crankshaft 52 rotates in the clockwise direction (as viewed in FIG. 3) when the first cylinder output rod 15 linearly moves from the extended position to the retracted position, the second cylinder output rod 21 linearly moves from the retracted position to the extended position, the third cylinder output rod 27 linearly moves from the extended position to the retracted position, and the fourth cylinder output rod 33 linearly moves from the retracted position to the extended position. This movement occurs when the machine goes from the beginning state to the second state.

The crankshaft 52 continues to rotate clockwise when the first cylinder output rod 15 linearly moves from the retracted position to the extended position, the second cylinder output rod 21 linearly moves from the extended position to the retracted position, the third cylinder output rod 27 linearly moves from the retracted position to the extended position, and the fourth cylinder output rod 33 linearly moves from the extended position to the retracted position. This movement occurs when the machine goes from the second state back to the beginning state. Therefore, the oscillating linear motion of cylinder rods 15, 21, 27, and 33 is transformed into the rotating motion at the output shaft 53. The power from output shaft 53 can then be attached to any device requiring mechanical power, such as for example a generator. Other embodiments of the subject invention could include a different input source other than an electric cylinder, such as a gasoline engine, or a gasoline engine coupled with a hydraulic transmission or other.

FIGS. 2 and 4 show another rotating motion apparatus in the form of a rack gearing apparatus 700. This apparatus includes rack gears 73, 74, 75, 76. FIG. 4 shows the back side of the rotating motion apparatus, which includes gears 85, 86, 87, 88, 89, 90, 91, 92 (FIG. 2 and FIG. 4) and sprag clutches 65, 66, 67, 68, 69, 70, 71, 72 (FIG. 2 and FIG. 4) that can be seen more clearly. The sprag clutches 65, 66, 67, 68, 69, 70, 71, 72 are mounted on shafts 63 and 64. The sprag clutches 65, 66, 67, 68, 69, 70, 71, 72 are operatively connected to their respective gears 85, 87, 89, 91, 92, 90, 88, 86. The rack gearing apparatus 700 is supported by support members 96, 97, 98. The first cylinder output rod 15 is connected to first rack gear 76. The second cylinder output rod 21 is connected to second rack gear 75. The third cylinder output rod 27 is connected to third rack gear 74, and the fourth cylinder output rod 33 is connected to fourth rack gear 73. The first rack gear 76 engages gears 85, 86. The second rack gear 75 engages gears 87, 88. The third rack gear 74 engages gears 89, 90. The fourth rack gear 73 engages gears 91, 92.

The gears 85, 86, 87, 88, 89, 90, 91, 92 rotate when the linear force is applied to the individual rack gear 73, 74, 75, 76. This linear force is then translated to rotating motion. Depending on which way the rack gears 73, 74, 75, 76 are moving, the gears 85, 86, 87, 88, 89, 90, 91, 92 will rotate or not rotate based on the way the sprag clutches 65, 66, 67, 68, 69, 70, 71, 72 are mounted on shafts 63 and 64. Top rack gear shaft 63 (FIG. 3 and FIG. 4) and bottom rack gear shaft 64 (FIG. 2 and FIG. 4) then have their rotational motion combined into output shaft 62 (FIG. 2 and FIG. 4) which will be in the same rotational motion, either clockwise or counterclockwise.

For example, for clockwise rotation (as viewed in FIG. 4) of the output shaft 62, the sprag clutches 65, 66, 67, 68 will be mounted on the shaft 63 such that their corresponding gears 85, 87, 89, 91 will only cause rotation of shaft 63 in the counterclockwise direction (viewed in FIG. 4). Likewise, the sprag clutches 69, 70, 71, 72 will be mounted on the shaft 64 such that their corresponding gears 92, 90, 88, 86 will only cause rotation of the shaft 64 in the counterclockwise direction (viewed in FIG. 4). When the hydraulic system goes from the beginning state to the second state, the first cylinder output rod 15 retracts to the retracted position, thereby also causing the first rack gear 76 to retract and rotate the gear 85 to cause rotation of the shaft 63 counterclockwise. Also, the second cylinder output rod 21 extends to the extend position, thereby also causing the second rack gear 75 to extend and rotate the gear 88 to cause rotation of the shaft 64 counterclockwise. Also, the third cylinder output rod 27 retracts to the retracted position, thereby also causing the third rack gear 74 to retract and rotate the gear 89 to cause rotation of the shaft 63 counterclockwise. Also, the fourth cylinder output rod 33 extends to the extend position, thereby also causing the fourth rack gear 73 to extend and rotate the gear 92 to cause rotation of the shaft 64 counterclockwise. Thus, the counterclockwise rotation of the gears 88, 92 causes counterclockwise rotation of the shaft 64. The counterclockwise rotation of the gears 85, 89 causes counterclockwise rotation of the output shaft 63.

When the hydraulic system goes from the second state to the beginning state, the first cylinder output rod 15 extends to the extended position, thereby also causing the first rack gear 76 to extend and rotate the gear 86 to cause rotation of the shaft 64 counterclockwise. Also, the second cylinder output rod 21 retracts to the retracted position, thereby also causing the second rack gear 75 to retract and rotate the gear 87 to cause rotation of the shaft 63 counterclockwise. Also, the third cylinder output rod 27 extends to the extended position, thereby also causing the third rack gear 74 to extend and rotate the gear 90 to cause rotation of the shaft 64 counterclockwise. Also, the fourth cylinder output rod 33 retracts to the retracted position, thereby also causing the fourth rack gear 73 to retract and rotate the gear 91 to cause rotation of the shaft 63 counterclockwise. Thus, the counterclockwise rotation of the gears 86, 90 cause counterclockwise rotation of the shaft 64. The counterclockwise rotation of the gears 87, 91 causes counterclockwise rotation of the output shaft 63. The continue oscillation of the rack gears causes continuous counterclockwise rotation of the output shafts 63, 64 and hence continuous clockwise rotation of the output shaft 62.

Output shaft 62 (FIG. 2 and FIG. 4) is then connected to any machine that is desirable, such as perhaps, a generator or alternator. A power supply 4 (FIG. 1) is electrically coupled to the controller 3 (FIG. 1) to supply power to the controller 3. The power supply 4 may be a battery or other suitable power source. The controller 3 (FIG. 1) is electrically coupled to the electric cylinder 1 (FIG. 1 thru FIG. 4).

Thus, the subject invention is based on Pascal's law, which states that a force applied to a confined liquid is transmitted throughout the liquid in all directions and is undiminished. The subject invention uses a force applied to a liquid in a confined space and captures the output force developed at other points in the liquid which is transformed into rotating motion. The input force is applied and transmitted to hydraulic cylinders that are arranged in a sequential manner and connected by hydraulic hoses. The liquid in the system acts to create a rigid connection between all of the hydraulic cylinder pistons, so that if one piston in the system is moved, all other pistons in the system will also move. One move of any piston will displace a certain amount of liquid, and this amount of liquid will displace all other pistons by the same distance, since all of the pistons are linked by a fixed amount of liquid.

The foregoing invention has been described in accordance with the relevant legal standards, thus the description is exemplary rather than limiting in nature. Variations and modifications to the disclosed embodiment may become apparent to those skilled in the art and fall within the scope of the invention. Furthermore, particular features of one embodiment can replace corresponding features in another embodiment or can supplement other embodiments unless otherwise indicated by the drawings or this specification.

What is claimed is:

1. A system for converting linear motion to rotary motion comprising:

at least first and second cylinders, wherein the first and second cylinders are in fluid communication with each other;
a first piston, wherein the first piston is slidably disposed in the first cylinder;
a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction; and
a drive, wherein the drive is in operative connection with the first piston, wherein the drive is operative to cause the first piston to move between a first position and a second position, wherein the drive comprises an electric cylinder.

2. The system of claim 1, wherein the first cylinder has a first port, wherein the second cylinder has a second port, wherein the first piston is in operative connection with the second piston such that movement of the first piston in the first direction causes the incompressible fluid to flow out of the first port of the first cylinder and into the second cylinder through the second port to cause movement of the second piston in the second direction, wherein the first direction of movement of the first piston is towards the first port, wherein the second direction of movement of the second piston is away from the second port.

3. The system of claim 1 further comprising a first sensor and a second sensor, wherein the first and second sensors are operatively coupled to the first cylinder, wherein the first cylinder has opposite first and second axial ends, wherein the first sensor detects when the first piston is at or near a first position along the longitudinal axis of the first cylinder, wherein the second sensor detects when the first piston is at or near a second position along the longitudinal axis of the first cylinder, wherein the first and second sensors are in operative connection with a controller, wherein the controller is in operative connection with the electrical cylinder, wherein the controller causes the electrical cylinder to move the first piston to the second position in response to the first sensor detecting the first piston, wherein the controller causes the electrical cylinder to move the first piston to the first position in response to the second sensor detecting the first piston.

4. A system for converting linear motion to rotary motion comprising:
at least first and second cylinders, wherein the first and second cylinders are in fluid communication with each other;
a first piston, wherein the first piston is slidably disposed in the first cylinder;
a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction, wherein the second direction is opposite the first direction; and
first and second cylinder rods, wherein the first cylinder rod is attached to the first piston, wherein the second cylinder rod is attached to the second piston, wherein the first and second cylinder rods are operatively coupled to a rotary motion apparatus.

5. The system of claim 4, wherein the rotary motion apparatus comprises a rack gearing apparatus.

6. The system of claim 5 further comprising:
a drive cylinder, wherein the first and drive cylinders are in fluid communication with each other; and
a drive piston, wherein the drive piston is slidably disposed in the drive cylinder;
wherein the drive cylinder contains an incompressible fluid, wherein the first piston is in operative connection with the drive piston such that movement of the drive piston in a third direction causes movement of the first piston in the first direction, wherein the rack gearing apparatus comprises:
a first shaft;
at least first and second rack gears; and
first and second sprag clutches, wherein the first and second sprag clutches are mounted on the first shaft, wherein the first gear is operatively connected to the first sprag clutch, wherein the second rack gear is operatively connected to the second sprag clutch, wherein the first cylinder rod is operatively coupled to the first rack gear, wherein the second cylinder rod is operatively coupled to the second rack gear, wherein the second piston is operative to move between a first position and a second position, wherein the third piston is operative to move between a third position and a fourth position, wherein the first cylinder rod moves linearly between a first extended position and a second retracted position in response to the second piston moving between a first position and a second position, wherein the second cylinder rod moves linearly between a third extended position and a fourth retracted position in response to the third piston moving between a third position and a fourth position, wherein movement of the first cylinder rod from the second extended position to the first retracted position causes rotation of the first shaft in a first rotational direction, wherein movement of the second cylinder rod from the fourth extended position to the third retracted position causes rotation of the first shaft in the first rotational direction.

7. They system of claim 5, wherein the rack gearing apparatus further comprises:
a second shaft;
a third shaft;
at least third and fourth rack gears; and
third and fourth sprag clutches, wherein the third and fourth sprag clutches are mounted on the first shaft, wherein the third gear is operatively connected to the third sprag clutch, wherein the fourth rack gear is operatively connected to the fourth sprag clutch, wherein the first cylinder rod is operatively coupled to the third rack gear, wherein the second cylinder rod is operatively coupled to the fourth rack gear, wherein movement of the first cylinder rod from the first retracted position to the second extended position causes rotation of the second shaft in the first rotational direction, wherein movement of the second cylinder rod from the third retracted position to the fourth extended position causes rotation of the second shaft in the first rotational direction, wherein the second shaft is operatively connected to the third shaft such that rotation of the first shaft in the first direction causes rotation of the third shaft in a second rotational direction, wherein the second shaft is operatively connected to the third shaft such that rotation of the second shaft in the first rotational direction causes rotation of the third shaft in the third rotational direction.

8. The system of claim 4, wherein the rotary motion apparatus comprises a rotating crank assembly.

9. The system of claim 8, wherein the rotating crank assembly comprises:
a crankshaft;
an output shaft;
at least first and second crank throws; and
at least first and second cranks;
wherein the first crank throw is rotatably connected to the first crank, wherein the second crank throw is rotatably connected to the second crank, wherein the first cylinder rod is operatively coupled to the first crank, wherein the second cylinder rod is operatively coupled to the second crank, wherein the second piston is operative to move between a first position and a second position, wherein the third piston is operative to move between a third position and a fourth position, wherein the first cylinder rod moves linearly between a first extended position and a second retracted position in response to the second piston moving between a first position and a second position, wherein the second cylinder rod moves linearly between a third extended position and a fourth retracted position in response to the third piston moving between a third position and a fourth position, wherein movement of the first cylinder rod from the second extended position to the first retracted position causes rotation of the crankshaft in a first rotational direction, wherein movement of the second cylinder rod from the fourth extended position to the third retracted position causes rotation of the crankshaft in the first rotational direction, wherein rotation of the crankshaft in the first direction causes rotation of the output shaft in the first rotational direction.

10. The system of claim 4, wherein the first cylinder has a first port, wherein the second cylinder has a second port, wherein the first piston is in operative connection with the second piston such that movement of the first piston in the first direction causes the incompressible fluid to flow out of the first port of the first cylinder and into the second cylinder through the second port to cause movement of the second piston in the second direction, wherein the first direction of movement of the first piston is towards the first port, wherein the second direction of movement of the second piston is away from the second port.

11. They system of claim 4 further comprising:
a drive cylinder, wherein the first and drive cylinders are in fluid communication with each other;
a drive piston, wherein the drive piston is slidably disposed in the drive cylinder;
wherein the drive cylinder contains an incompressible fluid, wherein the first piston is in operative connection with the drive piston such that movement of the drive piston in a third direction causes movement of the first piston in the first direction; and
a drive, wherein the drive is in operative connection with the drive piston, wherein the drive is operative to cause the drive piston to move between a first position and a second position.

12. The system of claim 11, wherein the drive comprises an electric cylinder.

13. The system of claim 12 further comprising a first sensor and a second sensor, wherein the first and second sensors are operatively coupled to the first cylinder, wherein the first cylinder has opposite first and second axial ends, wherein the first sensor detects when the first piston is at or near a first position along the longitudinal axis of the first cylinder, wherein the second sensor detects when the first piston is at or near a second position along the longitudinal axis of the cylinder, wherein the first and second sensors are in operative connection with a controller, wherein the controller is in operative connection with the electrical cylinder, wherein the controller causes the electrical cylinder to move the first piston to the second position in response to the first sensor detecting the first piston, wherein the controller causes the electrical cylinder to move the first piston to the first position in response to the second sensor detecting the first piston.

14. The system of claim 12, wherein the drive is an electric cylinder or a gas engine or a gas engine coupled with a hydraulic transmission or any combination of an electric cylinder or a gas engine or a gas engine coupled with a hydraulic transmission.

15. A system for converting linear motion to rotary motion comprising:
at least first and second cylinders, wherein the first and second cylinders are in fluid communication with each other;
a first piston, wherein the first piston is slidably disposed in the first cylinder; and
a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction, wherein the second direction is opposite the first direction;
a third cylinder, wherein the second and third cylinders are in fluid communication with each other;
a third piston, wherein the third piston is slidably disposed in the third cylinder;
a first cylinder rod, wherein the first cylinder rod is attached to the second piston; and
a second cylinder rod, wherein the second cylinder rod is attached to the third cylinder piston, wherein the third cylinder contains an incompressible fluid, wherein the second piston is in operative connection with the third piston such that movement of the second piston in a third direction causes movement of the second piston in the fourth direction, wherein the fourth direction is opposite the third direction, wherein the first and second cylinder rods are operatively coupled to a rotating crank assembly, wherein the rotating crank assembly comprises:
a crankshaft;
an output shaft;
at least first and second crank throws; and
at least first and second cranks, wherein the first crank throw is rotatably connected to the first crank, wherein the second crank throw is rotatably connected to the second crank, wherein the first cylinder rod is operatively coupled to the first crank, wherein the second cylinder rod is operatively coupled to the second crank, wherein the second piston is operative to move between a first position and a second position, wherein the third piston is operative to move between a third position and a fourth position, wherein the first cylinder rod moves linearly between a first extended position and a second retracted position in response to the second piston moving between a first position and a second position, wherein the second cylinder rod moves linearly between a third extended position and a fourth retracted position in response to the third piston moving between a third position and a fourth position, wherein movement of the first cylinder rod from the second extended position to the first retracted position causes rotation of the crankshaft in a first rotational direction, wherein movement of the second cylinder rod from the fourth extended position to the third retracted position causes rotation of the crankshaft in the first rotational direction, wherein rotation of the crankshaft in the first direction causes rotation of the output shaft in the first rotational direction.

16. The system of claim 15, wherein the first cylinder has a first port, wherein the second cylinder has a second port, wherein the first piston is in operative connection with the second piston such that movement of the first piston in the first direction causes the incompressible fluid to flow out of the first port of first cylinder and into the second cylinder through the second port to cause movement of the second piston in the second direction, wherein the first direction of movement of the first piston is towards the first port, wherein the second direction of movement of the second piston is away from the second port.

17. A system for converting linear motion to rotary motion comprising:
   at least first and second cylinders, wherein the first and second cylinders are in fluid communication with each other;
   a first piston, wherein the first piston is slidably disposed in the first cylinder; and
   a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction, wherein the second direction is opposite the first direction, wherein the first cylinder include a first port that is position at or near the longitudinal location of the first cylinder corresponding to a first position of the first piston, wherein the first cylinder includes a second port that is position at or near the longitudinal location of the first cylinder corresponding to a second position of the first piston, wherein the second cylinder includes a third port that is position at or near the longitudinal location of the second cylinder corresponding to a third position of the second piston, wherein the second cylinder includes a fourth port that is position at or near the longitudinal location of the second cylinder corresponding to a fourth position of the second piston.

18. A system for converting linear motion to rotary motion comprising:
   at least first and second cylinders, wherein the first and second cylinders are in fluid communication with each other;
   a first piston, wherein the first piston is slidably disposed in the first cylinder; and
   a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction, wherein the second direction is opposite the first direction, wherein the first piston has opposite first and second sides, wherein the first and second sides are transverse to the longitudinal axis of the first cylinder, wherein the first cylinder includes first and second ports, wherein the first port is position closer to the first side than the second side, wherein the second port is positioned closer to the second side than the first side, wherein the second piston has opposite third and fourth sides, wherein the third and fourth sides are transverse to the longitudinal axis of the second cylinder, wherein the second cylinder includes third and fourth ports, wherein the third port is position closer to the third side than the fourth side, wherein the fourth port is position closer to the fourth side than the third side, wherein the first and third sides face in the same direction, wherein the second and fourth sides face in the same direction.

19. A system for converting linear motion to rotary motion comprising:
   at least first and second cylinders, wherein the first and second cylinders are in fluid communication with each other;
   a first piston, wherein the first piston is slidably disposed in the first cylinder;
   a second piston, wherein the second piston is slidably disposed in the second cylinder, wherein the first and second cylinders contain an incompressible fluid, wherein the first piston is in operative connection with the second piston such that movement of the first piston in a first direction causes movement of the second piston in a second direction, wherein the second direction is opposite the first direction;
   a third cylinder;
   a fourth cylinder;
   a fifth cylinder, wherein the third fourth and fifth cylinders contain an incompressible fluid, wherein the second and third cylinders are in fluid communication with each other, wherein the third and fourth cylinders are in fluid communication with each other, wherein the fourth and fifth cylinders are in fluid communication with each other, wherein the first and fifth cylinders are in fluid communication with each other;
   a third piston, wherein the third piston is slidably disposed in the third cylinder, wherein the second piston is in operative connection with the third piston such that movement of the second piston in a second direction causes movement of the third piston in a third direction, wherein the third direction is opposite the second direction;
   a fourth piston, wherein the fourth piston is slidably disposed in the fourth cylinder, wherein the third piston is in operative connection with the fourth piston such that movement of the third piston in a third direction causes movement of the fourth piston in a fourth direction, wherein the fourth direction is opposite the third direction; and
   a fifth piston, wherein the fifth piston is slidably disposed in the fifth cylinder, wherein the fourth piston is in operative connection with the fifth piston such that movement of the fourth piston in the fourth direction causes movement of the fifth piston in a fifth direction, wherein the fifth direction is opposite the fourth direction.

20. The system of claim 19 further comprising a drive, wherein the drive is in operative connection with the first piston, wherein the drive is operative to cause the first piston to move between a first position and a second position.

* * * * *